United States Patent
Roloff et al.

(10) Patent No.: US 8,153,750 B2
(45) Date of Patent: Apr. 10, 2012

(54) VISCOSITY REDUCER FOR HIGHLY VISCOUS POLYOLS

(75) Inventors: Thorsten Roloff, Mönchengladbach (DE); Rainer Hoefer, Duesseldorf (DE)

(73) Assignee: Cognis IP Management GmbH, Duesseldorf (DE)

( * ) Notice: Subject to any disclaimer, the term of this patent is extended or adjusted under 35 U.S.C. 154(b) by 785 days.

(21) Appl. No.: 11/571,440

(22) PCT Filed: Jun. 22, 2005

(86) PCT No.: PCT/EP2005/006742
§ 371 (c)(1),
(2), (4) Date: Jan. 8, 2008

(87) PCT Pub. No.: WO2006/002812
PCT Pub. Date: Jan. 12, 2006

(65) Prior Publication Data
US 2008/0171833 A1     Jul. 17, 2008

(30) Foreign Application Priority Data
Jul. 1, 2004   (DE) .......................... 10 2004 031 787

(51) Int. Cl.
*C08G 18/30*   (2006.01)
*C08G 18/42*   (2006.01)
*C08G 18/48*   (2006.01)
*C08G 18/65*   (2006.01)
*C07C 69/66*   (2006.01)

(52) U.S. Cl. ................. 528/49; 252/182.24; 252/182.27; 252/182.28; 528/74.5; 528/76; 528/77; 528/80; 528/85; 560/179; 560/187

(58) Field of Classification Search ............. 252/182.24, 252/182.27, 182.28; 528/49, 74.5, 76, 77, 528/80, 85; 560/179, 187
See application file for complete search history.

(56) References Cited

U.S. PATENT DOCUMENTS

| 4,508,853 | A  | * | 4/1985 | Kluth et al. ................... 521/107 |
| 4,742,087 | A  | * | 5/1988 | Kluth et al. ................... 521/107 |
| 4,826,944 | A  |   | 5/1989 | Hoefer et al. |
| 6,730,768 | B2 | * | 5/2004 | Heidbreder et al. ............ 528/65 |
| 2003/0050357 | A1 | | 3/2003 | Pauls et al. |

FOREIGN PATENT DOCUMENTS

| DE | 4 201 343  |   | 7/1993 |
| DE | 4232167 A1 | * | 3/1994 |
| EP | 259722     |   | 3/1988 |
| GB | 877 134    |   | 9/1961 |
| SU | 899584 A   | * | 1/1982 |

* cited by examiner

*Primary Examiner* — Rabon Sergent
(74) *Attorney, Agent, or Firm* — Diehl Servilla LLC

(57) ABSTRACT

Ring opening products of epoxides with fatty acid methyl esters with alkanols or water are eminently suitable as viscosity adjusters (reducers) for high-viscosity polyols.

11 Claims, No Drawings

VISCOSITY REDUCER FOR HIGHLY VISCOUS POLYOLS

RELATED APPLICATIONS

This application is filed under 35 U.S.C. §371 claiming priority from application PCT/EP2005/006742 filed Jun. 22, 2005, which claims priority from German application 10 2004 03787.9 filed Jul. 1, 2004; the entire contents of each document are incorporated herein by reference.

FIELD OF THE INVENTION

This invention relates to ring-opening products of epoxides of fatty acid methyl esters with alkanols or water which are eminently suitable as viscosity adjusters (viscosity reducers) for high-viscosity polyols.

BACKGROUND OF THE INVENTION

Ring opening products of epoxides of triglycerides containing unsaturated fatty acid units and ring opening products of epoxides of fatty acid methyl esters containing unsaturated fatty acid units have been known for some time. In particular, ring opening products of such epoxides with alcohols are well-known. The corresponding epoxides are obtainable by epoxidation of triglycerides containing unsaturated fatty acid units or of fatty acid methyl esters containing unsaturated fatty acid units. In the ring opening of the epoxides mentioned with alcohols or polyols, the oxirane rings present in the epoxides are chemically modified in such a way that an OH group and an ether group are formed at adjacent carbon atoms. The OH groups formed are available for further reactions, for example for reaction with isocyanates to form polyurethanes.

A typical example of the use of the above-mentioned ring opening products is disclosed in EP-B-259722. This document relates to a process for the production of solid polyurethane materials by casting using isocyanates containing at least two isocyanate groups per molecule and alcohols containing at least two hydroxy groups per molecule. The polyurethane units used include inter alia polyols obtainable by addition of monohydric $C_{1-8}$ alcohols onto epoxidized triglyceride oils, optionally reacting the optionally purified addition products with $C_{2-4}$ alkylene oxides and optionally subjecting the products to a heat treatment before or after the alkoxylation.

DE-A-4201343 describes ring opening products of epoxidized fatty acid esters, for example methyl epoxyoctadecanoate (epoxidized oleic acid methyl ester), for reducing the pour point of lubricating oils.

GB 877134 describes the polymerization of epoxides of unsaturated fatty acids and their esters in the presence of boron trifluoride to form polyethers. The polymers formed are suitable for improving the viscosity index and the lubricating properties of mineral oils.

BRIEF DESCRIPTION OF THE INVENTION

Epoxide ring opening products of the special type mentioned in EP-B-259722, namely polyols obtainable by addition of monohydric $C_{1-8}$ alcohols onto epoxidized triglyceride oils, optionally reacting the optionally purified addition products with $C_{2-4}$ alkylene oxides and optionally subjecting the products to a heat treatment before or after the alkoxylation, generally have relatively high viscosities which makes them difficult to handle, for example to stir, pour and pump, particularly at low temperatures, but often even at temperatures of around 20° C.

The problem addressed by the present invention was to provide viscosity adjusters for high-viscosity polyols, more particularly for the epoxide ring opening products just mentioned. These viscosity adjusters would be effective even when used in relatively small quantities.

In addition, the invention sought to guarantee that the polyols mentioned, adjusted to a suitably low viscosity with the viscosity adjusters, would be able to be readily used with polyisocyanates in the production of polyurethanes.

It has now been found that ring opening products of epoxides of fatty acid methyl esters with alkanols or water are particularly low-viscosity substances which are suitable for use as viscosity adjusters. In particular, they are suitable as viscosity adjusters for the high-viscosity polyols used, for example, in the production of polyurethanes.

The present invention relates to the use of ring opening products of epoxides of fatty acid methyl esters with alkanols or water as viscosity adjusters (viscosity reducers) for high-viscosity polyols.

The ring opening products of epoxides of fatty acid methyl esters with alkanols or water to be used in accordance with the invention as viscosity adjusters (viscosity reducers) are also referred to hereinafter as "viscomod" compounds (a).

Compounds obtainable by addition of monohydric $C_{1-8}$ alcohols onto epoxidized triglyceride oils and optionally reacting the optionally purified addition products with $C_{2-4}$ alkylene oxides are expressly mentioned as high-viscosity polyols, i.e. substances to be viscosity-modified with the compounds (a). High-viscosity compounds of this type are also referred to hereinafter as "high-visco" polyols (b).

DETAILED DESCRIPTION OF THE INVENTION

Viscomod Compounds (a)

The ring opening products of epoxides of fatty acid methyl esters with alkanols or water to be used in accordance with the invention as viscosity adjusters are also referred to hereinafter as viscomod compounds (a).

"Epoxides of fatty acid methyl esters" (e) in the context of the present invention are understood to be compounds obtainable by epoxidation of methyl esters of unsaturated fatty acids. If these compounds (e) are reacted with alkanols and/or water, the oxirane rings present in (e) are opened and the viscomod compounds (a) are formed.

"Alkanols" in the context of the present invention are understood to be compounds which are present on a basic aliphatic skeleton containing 1 to 20 carbon atoms, which may be saturated or unsaturated, linear or branched, and 1 to 6 OH groups. An obvious proviso in this regard is that the maximum number of OH groups is limited by the number of C atoms of the alkanol. Accordingly, an alkanol containing 1 carbon atom can only be methanol; an alkanol containing 2 carbon atoms may contain 1 or 2 OH groups (ethanol or ethane-1,2-diol), etc. Apart from the OH groups, the alkanols preferably contain no other functional groups. In another preferred embodiment, the alkanols contain 1 to 8 carbon atoms and at most 3 OH groups per molecule. Alkanols containing 1 to 6 carbon atoms and 1 to 3 OH groups per molecule—especially methanol, ethanol, propanol, butanol, glycol, glycerol, trimethylol propane—are most particularly preferred.

Particularly preferred viscomod compounds (a) have a Brookfield viscosity (as measured at 25° C.) below 800 and, more particularly, below 400 mPas.

High-Visco Polyols (b)

As already mentioned, the high-visco polyols (b) are high-viscosity polyols obtainable by addition of monohydric $C_{1-8}$ alcohols onto epoxidized triglyceride oils, optionally reacting the optionally purified addition products with $C_{2-4}$ alkylene oxides and optionally subjecting the products to a heat treatment.

The epoxidized triglyceride oils which may be used for the production of high-visco polyols (b) are known per se from the prior art. They are used, for example, as so-called "epoxy plasticizers" in other technical fields and are also commercially available for this purpose. Epoxidized triglyceride oils are obtainable by epoxidation of unsaturated oils, for example soybean oil, rapeseed oil, linseed oil, tall oil, cottonseed oil, peanut oil, palm oil, sunflower oil (from old and new plants), colza oil or neat's-foot oil, for example in the presence of catalytic quantities of peracetic acid or performic acid. The olefinic double bonds of the fatty acid units of the triglyceride are converted into oxirane rings by the epoxidation reaction either completely or in part, depending on the quantity of peracetic acid used. Preferred unsaturated oils are triglycerides with an iodine value of 50 to 200 which, through extensive epoxidation of the olefinic double bonds, are converted into epoxidates with an epoxide oxygen content of 3 to 10% by weight. Epoxidized triglyceride oils with a content of 4 to 8% by weight epoxide oxygen are particularly preferred.

Particularly preferred substances from the group of epoxidized triglycerides or their alkyl esters are:

epoxidized soybean oil (for example, EDENOL® D 81, a product of Cognis Deutschland GmbH & Co. KG)

epoxidized linseed oil (for example, EDENOL® B 316, a product of Cognis Deutschland GmbH & Co. KG).

As already mentioned, mono- and/or polyhydric $C_{1-8}$ alcohols are used for ring opening of the epoxidized triglyceride oils. Suitable alcohols are both linear alcohols, such as methanol, ethanol, n-propanol, n-butanol, n-pentanol, n-hexanol, n-heptanol, n-octanol, glycol, trimethylol propane, and isomers thereof branched in the alkyl chain or carrying the hydroxyl group at a secondary or tertiary carbon atom, for example i-propanol, i-butanol or 2-ethylhexyl alcohol. Alcohols from the group consisting of methanol, ethanol, n-propanol, i-propanol, n-butanol, i-butanol, t-butanol and 2-ethylhexyl alcohol are preferably used for the addition onto epoxidized triglyceride oils and/or alkyl esters thereof. Of these alcohols, methanol is particularly preferred.

As known from the prior art, the addition of mono- and/or polyhydric alcohols containing 1 to 8 carbon atoms onto epoxidized triglyceride oils is preferably carried out in the presence of an acidic catalyst. Suitable acidic catalysts are, for example, typical mineral acids, such as concentrated sulfuric acid for example. However, Lewis acids, such as boron trihalides or derivatives thereof, may also be used as acidic catalysts or the reaction may be carried out in the presence of an acidic ion exchanger. The use of acidic ion exchangers is particularly preferred because it affords the optimal possibility of removing the catalyst from the reaction mixture. The ring opening catalyst may be removed by washing or precipitation after the reaction or may be left in the reaction product after neutralization. Neutralization with sodium methylate or, more particularly, dialkyl-ethanolamines, preferably dimethyl or diethyl ethanolamine, the neutralization product being left in the product mixture, is the preferred procedure.

A molar ratio of alcohol to triglyceride oil of 1.05 to 10 and preferably 3 to 10 mol alcohol per mol epoxide oxygen is adjusted for the addition of mono- and/or polyhydric $C_{1-8}$ alcohols onto epoxidized triglyceride oils. This means that an excess of alcohol is regularly used for the addition reaction in practice in order to ensure that more or less all oxirane rings are opened and converted into HO—C—C—OR groups, where R is the alkyl group of the $C_{1-8}$ alcohol used.

The polyols obtained as described above may be freed from excess or unreacted educts by methods known per se. For example, the alcohol used for opening the oxirane rings in the epoxidized triglyceride oils and/or their alkyl esters can be removed by distillation, optionally under reduced pressure. However, other purification methods known per se in this field may also be used.

In one embodiment, the polyols obtainable by reaction of epoxidized triglyceride oils and/or alkyl esters thereof with $C_{1-8}$ alcohols are reacted with propylene oxide. The necessary conditions are known to the expert. The molar ratio of alkylene oxide to epoxidized triglyceride oil ring-opened with mono- and/or polyhydric $C_{1-8}$ alcohols and/or alkyl esters thereof is preferably adjusted to a value of 1 to 10 mol propylene oxide to 1 mol epoxide oxygen in the propoxylation reaction.

If desired, the polyols obtainable as just described may be subjected to a heat treatment. If a propoxylation was carded out in the production of the polyols as described above, the heat treatment or thermal after-reaction may be carried out before and/or after the propoxylation. However, it is preferably carried out after the propoxylation.

The heat treatment of the polyol is advantageous because its water content can thus be reduced to virtually zero in this way, i.e. largely water-free polyols are available.

The Use According to the Invention

As already mentioned, the components (a) are eminently suitable for adjusting, i.e. reducing, the viscosity of the high-viscosity polyols (b). In this way, not only can the compounds (b) be better handled, mixtures of (a) and (b)—the compounds (a) are generally added to the compounds (b) in only relatively small quantities of 1 to 20%—are more suitable than the compounds (b) for reaction with polyisocyanates in the production of polyurethanes by virtue of their lower viscosity.

Another advantage of the compounds (a) is that they can be incorporated in polyurethanes through the OH groups present. In this sense, they may be regarded as reactive diluents, i.e. as diluents for high-viscosity polyols which, because they have one or more NCO-reactive OH groups, may simultaneously perform the additional function of a reaction component for the polyurethane reaction.

Use in the Production of Polyurethanes

The present invention also relates to a process for the production of polyurethanes by reaction of high-viscosity polyols (b)—preferably selected from the compounds obtainable by addition of monohydric $C_{1-8}$ alcohols onto epoxidized triglyceride oils and optionally reacting the optionally purified addition products with $C_{2-4}$ alkylene oxides—with polyisocyanates, characterized in that the viscosity of the polyols (b) is adjusted by the addition of ring opening products of epoxides of fatty acid methyl esters with alkanols or water (i.e. by the addition of the compounds (a) mentioned above).

EXAMPLES

Substances Used

Compounds from the Group of Viscomod Compounds (a)
Sovermol 710:
SOVERMOL® 710:
  Fatty acid methyl ester epoxide ring-opened with methanol (SOVERMOL® 710, a product of Cognis Deutschland GmbH & Co. KG)
SOVERMOL® 1102:
  Fatty acid methyl ester epoxide ring-opened with ethanediol (SOVERMOL® 1102, a product of Cognis Deutschland GmbH & Co. KG)
Compounds from the Group of High-Visco Polyols (b)
SOVERMOL® 1068:
  Fatty acid triglyceride epoxide ring-opened with methanol (SOVERMOL® 1068, a product of Cognis Deutschland GmbH & Co. KG)

EXAMPLES FOR VISCOSITY REDUCTION

Comparison Example A

The Brookfield viscosity of SOVERMOL® 1068 was measured at 25° C. (spindle 21, 6 r.p.m.) and amounted to 3620 mPas.

Comparison Example B

The Brookfield viscosity of SOVERMOL® 710 was measured at 25° C. (spindle 21, 6 r.p.m.) and amounted to 70 mPas.

Comparison Example C

The Brookfield viscosity of SOVERMOL® 1102 was measured at 25° C. (spindle 21, 6 r.p.m.) and amounted to 300 mPas.

Example 1

90 parts by weight SOVERMOL® 1068 and 10 parts by weight SOVERMOL® 710 were mixed together. The Brookfield viscosity of the mixture (25° C./spindle 21/6 r.p.m.) measured 2325 mPas.

Example 2

80 parts by weight SOVERMOL® 1068 and 20 parts by weight SOVERMOL® 710 were mixed together. The Brookfield viscosity of the mixture (25° C./spindle 21/6 r.p.m.) measured 1508 mPas.

Example 3

90 parts by weight SOVERMOL® 1068 and 10 parts by weight SOVERMOL® 1102 were mixed together. The Brookfield viscosity of the mixture (25° C./spindle 21/6 r.p.m.) measured 2575 mPas.

Example 4

80 parts by weight SOVERMOL® 1068 and 20 parts by weight SOVERMOL® 1102 were mixed together. The Brookfield viscosity of the mixture (25° C./spindle 21/6 r.p.m.) measured 1858 mPas.

It is clear from Examples 1 to 4 that the viscosity-adjusting effect of compounds (a) on compounds (b) is excellent.

We claim:

1. A method for reducing the viscosity of a polyol comprising the step of forming a mixture by admixing with a polyol, a ring opening product of epoxides of fatty acid methyl esters with alkanols or water, wherein said ring opening product is present in a viscosity-reducing amount of from 1 to 20 weight percent based on the total weight of the mixture of the polyol and the ring opening product, and whereby the viscosity of said polyols is reduced.

2. The method of claim 1, wherein said polyol comprises at least one member selected from compounds obtained by the steps of reacting monohydric $C_{1-8}$ alcohols with epoxidized triglyceride oils to form ring-opened addition products, optionally purifying said addition products, and optionally further reacting with $C_{2-4}$ alkylene oxides.

3. The method of claim 1, wherein said ring opening product of epoxides of fatty acid methyl esters comprise the ring opening product of said epoxides with alkanols containing 1 to 6 carbon atoms and 1 to 3 OH groups.

4. The method of claim 3, wherein said polyol comprises at least one member selected from compounds obtained by the steps of reacting monohydric $C_{1-8}$ alcohols with epoxidized triglyceride oils to form ring-opened addition products, optionally purifying said addition products, and optionally further reacting with $C_{2-4}$ alkylene oxides.

5. The method of claim 3, wherein said alkanols comprise at least one member selected from the group consisting of methanol, ethanol, propanol, butanol, ethylene glycol, glycerol and trimethylol propane.

6. The method of claim 5, wherein said polyol comprises at least one member selected from compounds obtained by the steps of reacting monohydric $C_{1-8}$ alcohols with epoxidized triglyceride oils to form ring-opened addition products, optionally purified purifying said addition products, and optionally further reacting with $C_{2-4}$ alkylene oxides.

7. The method of claim 1, wherein said ring opening product of epoxides of fatty acid methyl esters comprise the ring opening product of said epoxides with water.

8. The method of claim 7, wherein said polyol comprises at least one member selected from compounds obtained by the steps of reacting monohydric $C_{1-8}$ alcohols with epoxidized triglyceride oils to form ring-opened addition products, optionally purifying said addition products, and optionally further reacting with $C_{2-4}$ alkylene oxides.

9. The method of claim 7, wherein the ring opening product has a Brookfield viscosity of less than 800 mPas at 25° C.

10. A process for the production of polyurethanes comprising the step of reacting a polyol with a polyisocyanate, wherein the viscosity of said polyol is reduced by adding a ring opening product of epoxides of fatty acid methyl esters with at least one of alkanols and water and wherein said ring opening product is present in an amount of from 1 to 20 weight percent based on the total weight of the polyol and the ring opening product.

11. The process of claim 10, wherein said polyol comprises compounds obtained by the steps of reacting monohydric $C_{1-8}$ alcohols with epoxidized triglyceride oils to form ring-opened addition products, optionally purifying said addition products, and optionally further reacting with $C_{2-4}$ alkylene oxides.

* * * * *